(12) United States Patent
Ciaburri et al.

(10) Patent No.: US 10,878,645 B2
(45) Date of Patent: Dec. 29, 2020

(54) REAL TIME HUMS

(71) Applicant: Sikorsky Aircraft Corporation, Stratford, CT (US)

(72) Inventors: Daniel A. Ciaburri, Milford, CT (US); James N. Rozak, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 205 days.

(21) Appl. No.: 15/952,990

(22) Filed: Apr. 13, 2018

(65) Prior Publication Data

US 2018/0308297 A1 Oct. 25, 2018

Related U.S. Application Data

(60) Provisional application No. 62/487,137, filed on Apr. 19, 2017.

(51) Int. Cl.
*G07C 5/08* (2006.01)
*G07C 5/00* (2006.01)
*B64D 45/00* (2006.01)
*B64F 5/60* (2017.01)
*B64F 5/40* (2017.01)
*B64C 27/06* (2006.01)

(52) U.S. Cl.
CPC ............ *G07C 5/085* (2013.01); *B64D 45/00* (2013.01); *G07C 5/008* (2013.01); *B64C 27/06* (2013.01); *B64D 2045/008* (2013.01); *B64D 2045/0085* (2013.01); *B64F 5/40* (2017.01); *B64F 5/60* (2017.01)

(58) Field of Classification Search
CPC ........ G07C 5/085; G07C 5/008; B64D 45/00; B64D 2045/008; B64D 2045/0085; B64F 5/40; B64F 5/60; B64C 27/06
USPC ........................................ 701/1, 14
See application file for complete search history.

(56) References Cited

U.S. PATENT DOCUMENTS

| | | | |
|---|---|---|---|
| 7,983,809 B2* | 7/2011 | Kell ................. | G06Q 10/0875 701/29.3 |
| 8,131,420 B2 | 3/2012 | Lynch et al. | |
| 8,914,205 B2 | 12/2014 | Chandran et al. | |
| 9,576,404 B2 | 2/2017 | Ziarno et al. | |
| 9,701,420 B1* | 7/2017 | Tucker .................. | B64D 45/00 |
| 10,075,228 B2* | 9/2018 | Klippert .................. | H04B 7/155 |
| 10,481,130 B2* | 11/2019 | Cokonaj ................. | G01N 29/44 |
| 2007/0260726 A1* | 11/2007 | Rozak ..................... | G06Q 10/06 709/224 |

(Continued)

OTHER PUBLICATIONS

The extended European search report; EP Application No. 18167186.8; EP Filing Date: Apr. 13, 2018; dated Jun. 13, 2018; pp. 1-9.

*Primary Examiner* — Jaime Figueroa
(74) *Attorney, Agent, or Firm* — Baker Botts L.L.P.

(57) ABSTRACT

A system and method for operating an aircraft. The system includes a health and usage monitoring system (HUMS) system for sensing health and usage data during flight of the aircraft, and a data transmission unit. The data transmission unit retrieves HUMS data from the HUMS system and generates a trigger signal when the retrieved HUMS data meets a selected criterion, the trigger signal being indicative of a condition of the aircraft. In response to the trigger signal, the data transmission unit transmits the retrieved HUMS data to a remote location.

18 Claims, 4 Drawing Sheets

(56) References Cited

U.S. PATENT DOCUMENTS

| | | | |
|---|---|---|---|
| 2009/0083050 A1* | 3/2009 | Eltman | G06Q 10/06 705/305 |
| 2009/0157358 A1* | 6/2009 | Kim | G01L 1/16 702/185 |
| 2011/0112878 A1* | 5/2011 | Isom | G06Q 10/06311 705/7.13 |
| 2011/0313614 A1* | 12/2011 | Hinnant, Jr. | G01M 5/0041 701/33.9 |
| 2012/0078544 A1* | 3/2012 | Lynch | B64C 27/008 702/56 |
| 2012/0191273 A1 | 7/2012 | Jacobs et al. | |
| 2013/0197725 A1* | 8/2013 | O'Dell | H04B 7/18508 701/14 |
| 2013/0197739 A1 | 8/2013 | Gallagher et al. | |
| 2013/0211737 A1 | 8/2013 | Batcheller et al. | |
| 2014/0309820 A1* | 10/2014 | O'Dell | B64F 5/60 701/3 |
| 2014/0350780 A1* | 11/2014 | Chai | G05D 1/0055 701/32.8 |
| 2015/0113649 A1* | 4/2015 | Angelov | G06F 11/0751 726/23 |
| 2016/0036513 A1* | 2/2016 | Klippert | H04W 4/40 455/15 |
| 2016/0052640 A1* | 2/2016 | Buehler | B64D 45/00 340/945 |
| 2016/0055685 A1* | 2/2016 | Lilly | G07C 5/0808 701/1 |
| 2016/0165377 A1* | 6/2016 | Beran | H04Q 9/00 370/241 |
| 2016/0203659 A1* | 7/2016 | Chai | G05B 23/0256 701/32.8 |
| 2016/0368378 A1* | 12/2016 | Berenbaum | H04L 67/12 |
| 2017/0115253 A1* | 4/2017 | Cokonaj | G07C 5/0841 |
| 2017/0124785 A1* | 5/2017 | Rozak | G06F 30/20 |
| 2017/0261406 A1* | 9/2017 | Dion | G05B 23/0235 |
| 2018/0170532 A1* | 6/2018 | Black | G01M 5/0066 |

\* cited by examiner

REAL TIME HUMS

CROSS REFERENCE TO RELATED APPLICATIONS

The present application claims priority from U.S. Provisional Application Ser. No. 62/487,137, filed on Apr. 19, 2017, the contents of which are incorporated herein by reference in their entirety.

BACKGROUND OF THE INVENTION

The present invention is directed to a system and method of monitoring the health of an aircraft and aircraft components and, in particular, to providing an analysis of health and usage monitoring system (HUMS) data for analysis during flight of the aircraft.

Aircraft are often equipped with a health and usage monitoring system (HUMS) to help ensure the maintenance and safe operation of the aircraft. During flight, the HUMS collects data with respect to various components of the aircraft, such as the engine, gearbox, rotors, etc. The HUMS data includes parameters such as engine torque, gearbox temperature, gearbox vibration, air speed, etc. The HUMS data is collected in-flight and stored at a memory device located onboard the aircraft. When the aircraft lands, the HUMS data is downloaded to a computer that analyzes the HUMS data and recommends an appropriate action, such as a maintenance procedure, based on the analysis. One drawback of this process is that the HUMS data can only be analyzed between flights, i.e., once the aircraft is on the ground. As a result, remedial action can be taken only when the aircraft is landed. Therefore, if a hazardous condition arises during a flight, the pilot or crew, while they may be alerted to the hazardous condition, may not have enough information to take appropriate remedial action in-flight. Accordingly, it is desirable to provide a method for reviewing HUMS data while the aircraft is in-flight in order to provide to a pilot or crew suitable instructions for addressing an in-flight condition of the aircraft.

SUMMARY OF THE INVENTION

According to one embodiment of the present invention, a method of operating an aircraft includes: recording health and usage monitoring system (HUMS) data at a HUMS system of the aircraft during flight of the aircraft; generating a trigger signal indicative of a condition of the aircraft; and transmitting the HUMS data from the aircraft to a remote location in response to the trigger signal.

According to another embodiment of the present invention, a system for operating an aircraft includes: a health and usage monitoring system (HUMS) system for sensing health and usage data during flight of the aircraft; and a data transmission unit for retrieving HUMS data from the HUMS system, generating a trigger signal when the retrieved HUMS data meets a selected criterion and transmitting the retrieved HUMS data to a remote location in response to the trigger signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
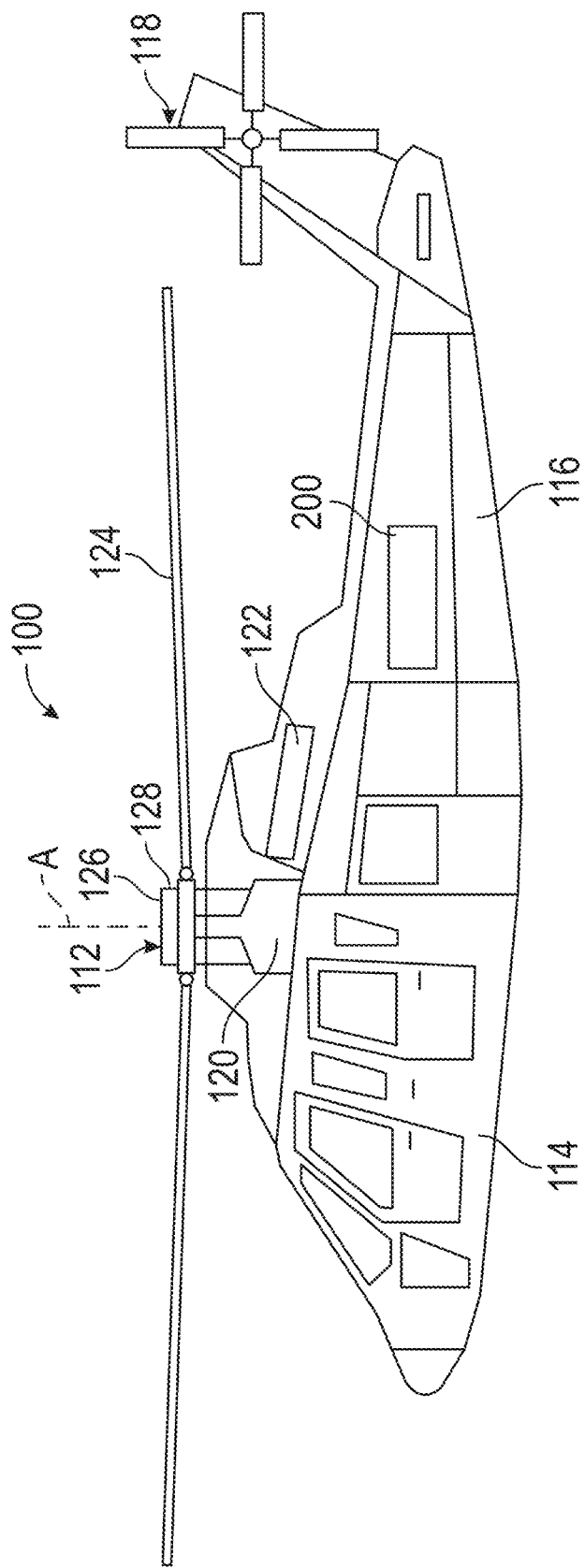
FIG. 1 schematically illustrates a conventional rotary wing aircraft having a main rotor assembly and which includes a real time health and usage management system (RT HUMS)

Referring now to the Figures, where the invention will be described with reference to specific embodiments, without limiting same, FIG. 1 schematically illustrates a conventional rotary wing aircraft 100 having a main rotor assembly 112 and which includes a real time health and usage management system (RT HUMS). The aircraft 100 includes an airframe 114 having an extending tail 116 which mounts an anti-torque system, such as a tail rotor assembly 118. The main rotor assembly 112 is driven about an axis of rotation A through a transmission (illustrated schematically at 120) by one or more engines 122. The main rotor assembly 112 includes a plurality of rotor blades 124 mounted to a rotor hub 126, and a swashplate 128 that is used to affect a state or orientation of the rotor blades 124. The rotor blades 124 can have a variable pitch that can be used to affect pitch and roll angles of the aircraft 100 as well as velocity of the aircraft 100. The pitch of the rotor blades 124 can be controlled by a collective control or by a cyclic control.

Aircraft 100 includes a real-time health and usage management system (RT HUMS) 200. Various sensors (not shown) around the aircraft obtain aircraft usage and health data, collectively referred to as HUMS data. The sensors provide this HUMS data to the RT HUMS 200. The HUMS data may be in the form of parametric data and/or mechanical diagnostics data. Parametric data includes data regarding the operation of the aircraft and its various components. In various embodiments, parametric data may be recorded about 1 to 20 times per second. Various parametric data include engine torque, engine speed, altitude, gearbox temperature, vertical acceleration, for example. Mechanical diagnostics data includes data regarding a state or condition of the aircraft or of one or its various components. Mechanical diagnostics data may be recorded less frequently that parametric data. In various embodiments, mechanical diagnostics data is recorded once every 5-8 minutes.

The RT HUMS 200 stores the HUMS data to an onboard data storage unit to be accessed once the aircraft is back on the ground. Additionally, the RT HUMS 200 allows for in-flight diagnosis of the HUMS data. The RT HUMS 200 collects HUMS data related to a trigger signal and transmits the collected data to a remote location, i.e., a ground location. The trigger signal may be indicative of a need for caution or warning with respect to an aspect of flight. At the remote location, the data is analyzed in order to determine a mechanical problem or condition of the aircraft. From the analysis, an appropriate flight crew-enabling information can be determined that when implemented at the aircraft alleviates or mitigates the mechanical problem or condition of the aircraft. The flight crew-enabling information can then be transmitted to the aircraft 100 in order for a pilot or crew of the aircraft 100 who may implement a flight command at the aircraft using the flight crew-enabling information. If necessary, the remote location can send a request for additional information to the aircraft 100 and the aircraft 100 can send the requested data to the remote location in response to the data request. The flight crew-enabling information can then be determined from the originally transmitted data and the requested data.

Figure 2:
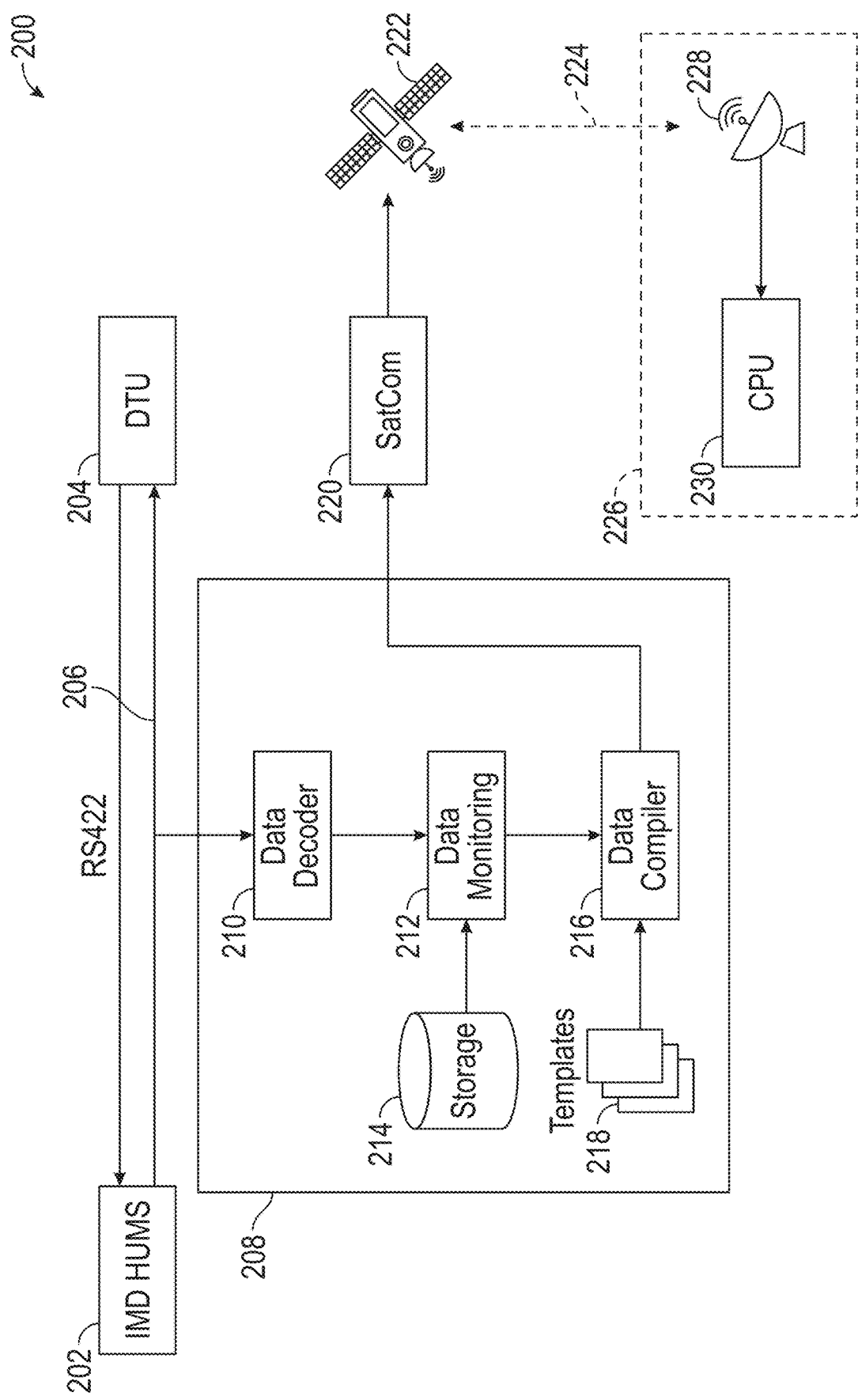
FIG. 2 shows a schematic diagram of the RT HUMS of FIG. 1 in an embodiment.

FIG. 2 shows a schematic diagram of the RT HUMS 200 of FIG. 1 in an embodiment. The RT HUMS 200 includes the HUMS 202 and data storage unit 204. During in-flight operation, HUMS 202 collects data from the various sensors of the aircraft 100 and provides the HUMS data to the data storage unit 204 via bus 206. The data storage unit 204 stores the data until the aircraft has landed at an appropriate location. Once the aircraft has landed, the data is downloaded from the data storage unit 204 to a central processor that analyzes the data in order to diagnose the state or condition of the aircraft and/or its various components.

The RT HUMS 200 includes a HUMS data communication unit 208 that retrieves data from the bus 206 and monitors the data in order to determine a state of the aircraft or of its various components. A trigger signal can be generated at the HUMS data communication unit 208 when examination of the retrieved data indicates that there is a triggering condition or event such as the occurrence of a hazardous condition for a component of the aircraft 100 or operation of the component outside of a selected operation zone. The triggering signal is therefore generated when a state of the aircraft changes and typically when the state of the aircraft crosses over a threshold or limit that indicates safe operation of the aircraft. The type of trigger signal generated is indicative of the type of triggering condition or event. Therefore, it is possible to determine what the triggering condition or event is by observing the type of trigger signal generated. The trigger signal can be generated by comparing a selected parameter indicative of the state or condition of the aircraft to a selected threshold value. In one embodiment, the trigger signal may be generated when the parameter becomes greater than the selected threshold value. As an example, a gearbox temperature trigger signal can be generated when a temperature of an oil of a gearbox exceeds a selected temperature threshold.

The HUMS data communication unit 208 includes a decoder 210, monitoring unit 212 and data compiler 216 for providing relevant HUMS data to the remote location. The decoder 210 taps into the bus 206 between HUMS 202 and data storage system 204 and retrieves HUMS data being transferred along the bus 206. The decoder 210 places the data into a form that can be read and processed by monitoring unit 212. The monitoring unit 212 stores HUMS data at local data storage 214. The local data storage 214 may store data only for a selected amount of time (e.g., 30 seconds) and discards data older than a selected time limit. The monitoring unit 212 also reviews the retrieved HUMS data for an indication of a hazardous condition or operating state. Upon determining a hazardous condition or operation state, the monitoring unit 212 generates a relevant trigger signal. The trigger signal is received at data compiler 216 which retrieves a relevant data template from template storage 218 and fills in the relevant data template with HUMS data indicated by the selected template. Each template in template storage 218 is related to a selected condition or state of the aircraft and can be retrieved based on the type of trigger signal. A template may include a list of all relevant parametric data signals as well as a list of relevant mechanical diagnostics data for the triggering event. For example, one template may be used to gather data for parameters related to engine torque condition and another template may be used to gather data for parameters related to excessive vibration of a component. In various embodiments, the relevant data is retrieved from the local data storage 214.

Once the selected template has been filled with the appropriate HUMS data indicated by the template, the template and data are transmitted over a communication link to a remote location 226 via an onboard communication device 220. In various embodiments, the remote location 226 is a ground location. In one embodiment, the communication link is a satellite communication link 224 and the onboard communication device 220 is a satellite communication transmitter/transducer that communicates to the remote location 226 by satellite 222 and ground receiver 228. Using satellite communications, the HUMS data can be transferred from the aircraft 100 to the remote location 226 from almost any location of the aircraft 100.

The transmitted data generally includes a collection of historical HUMS data, as retrieved from the local data storage 214. Once the historical HUMS data has been transmitted, real-time HUMS data can be streamed to the remote location 226 directly from HUMS 202. The streamed data can then be analyzed in real-time, i.e., as the HUMS data is received from HUMS 202. In one embodiment, the transmission of HUMS data continues until the remote location 226 provides a signal to the aircraft to end transmission of the HUMS data. In another embodiment, an operator at the remote location 226 can provide a request signal to the RT HUMS 200 to request specific HUMS data from the RT HUMS 200, thereby activating the HUMS data communication unit 208 to retrieve the requested HUMS data.

The HUMS data includes parametric data that is generally streamed beginning from a selected time prior to generation of the trigger signal and continues to stream data until the data stream is disabled or terminated from a disabling signal from the remote location 226. The mechanical diagnostics data can be data that is recorded from the beginning of the flight.

The remote location 226 includes a processor 230 that analyzes the HUMS data received from the aircraft 100 in order to determine a condition or state of the aircraft 100. Analysis of the HUMS data may be used to determine flight crew-enabling information that can be used by the pilot and/or flight crew to implement a flight command at the aircraft 100 during the flight of the aircraft to alleviate or mitigate the condition indicated by the trigger signal. The flight crew-enabling information may be transmitted from the remote location 226 to the aircraft using any suitable communication channel, such as the satellite communication link, a radio frequency communication link, etc. Upon receiving the instruction from the ground location, the pilot or crew can implement a flight command based on the flight crew-enabling information in order to fly the aircraft.

Figure 3:
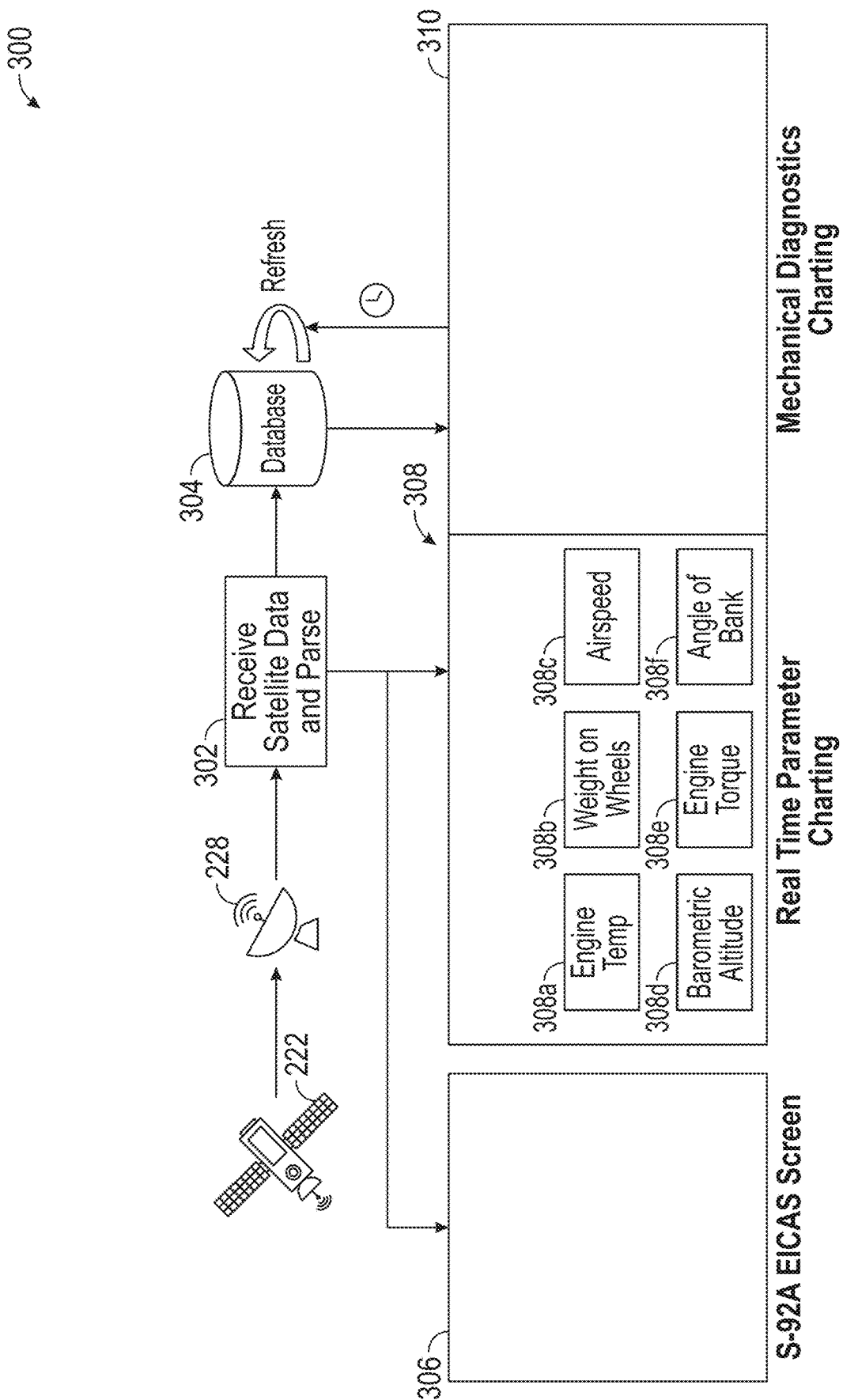
FIG. 3 shows a schematic diagram of a remote location in communication with the RT HUMS of FIG. 2 in an embodiment.

FIG. 3 shows a schematic diagram 300 of the remote location 226 in an embodiment. The remote location 226 includes a processor that performs various programs for analyzing the HUMS data in real-time. Upon receiving HUMS data at the ground receiver 228 from satellite 222, the data is parsed at data parser 302 to separate the parametric data from the mechanical diagnosis data. The parametric data can be provided to show real-time flight mechanics of the aircraft. In one embodiment, the parametric data can be displayed in the format of an engine-indicating and crew-alerting display (EICAS) 306. The display 306 mimics the actual avionics display onboard the aircraft. Display 306 typically includes instrumentation of various engine parameters such as Engine torque, engine oil temperature, engine speed, fuel quantities, fuel flow, main gearbox oil pressure and any active cautions and warnings, for example. The schematic 300 further shows charts 308 of various relevant parameters in real time that can be formed using the parsed data. The exemplary charts 308 shown in FIG. 3 show time-evolution of various parameters including engine temperature 308a, weight-on-wheels 308b, airspeed 308c, barometric altitude 308d, engine torque 308e, and angle of bank 308f, which are shown for illustrative purposes only.

The mechanical data is sent to a ground-based database 304. The mechanical data in the ground-based database 304 is used to provide mechanical diagnostic charts 310 for the various components. The ground-based database 304 can be accessed on a periodic basis in order update or refresh the mechanical diagnostic charts 310. The mechanical diagnostic charts 310 can be presented alongside the real time charts 308 at the remote location 226.

An operator at the remote location 226 can review the data displayed at the remote location 226 and determine flight crew-enabling information for the aircraft. At any time, the operator can send an 'END TRANSMISSION' signal to the aircraft to end the data transmission. Alternatively, the operator may send a request signal to the aircraft requesting further HUMS data from the aircraft as specified by the operator.

Figure 4:
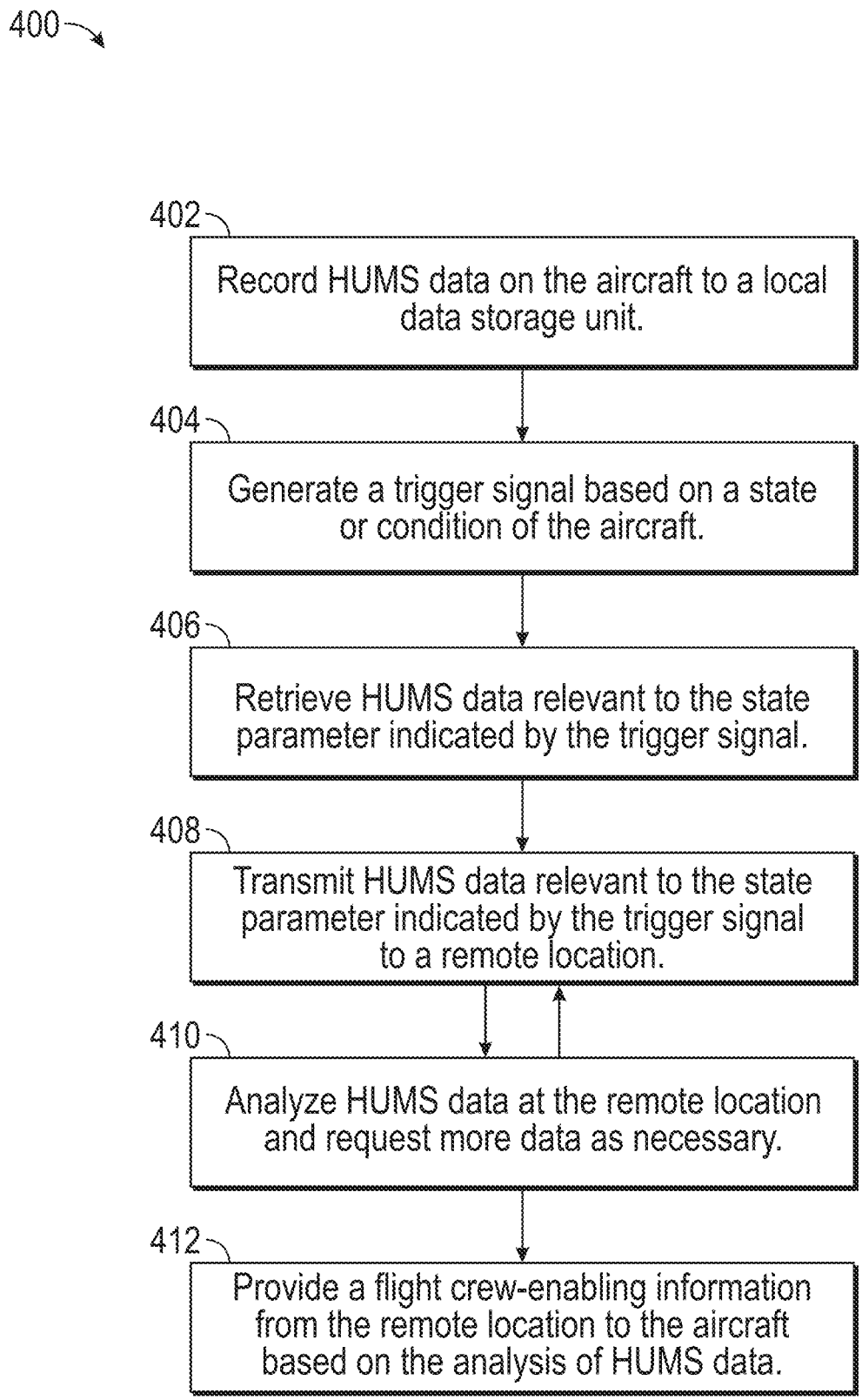
FIG. 4 shows a flowchart illustrating a method for providing in-flight HUMS information that can be used to provide remedial in-flight responses at the aircraft.

FIG. 4 shows a flowchart 400 illustrating a method for providing in-flight HUMS information that can be used to provide remedial in-flight responses at the aircraft. In box 402, the HUMS data is recorded at a local data storage of the aircraft. In box 404, a trigger signal is generated based on a state or condition of the aircraft. The type of trigger generated is indicative of a caution/warning/triggering event and identifies the caution/warning/triggering event. In box 406, HUMS data is retrieved based on the type of trigger signal by selecting a template suitable for the related caution/warning/triggering event. In box 408, the retrieved HUMS data is transmitted to a remote location 26, such as a ground location that includes processor for analyzing the HUMS data. In box 410, the HUMS data is analyzed at the remote location in order to determine a source of the caution, warning or triggering event as well as to determine flight crew-enabling information that can be used by the pilot and/or flight crew to operate the aircraft. In box 412, the flight crew-enabling information is transmitted from the remote location to the aircraft.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of operating an aircraft, comprising:
    recording health and usage monitoring system (HUMS) data at a HUMS system of the aircraft during flight of the aircraft;
    generating a trigger signal indicative of a condition of the aircraft;
    selecting, responsive to the trigger signal, a data template related to the condition of the aircraft indicated by the trigger signal;
    filling in the selected data template with HUMS data indicated by the selected data template; and
    transmitting the data template filled in with the HUMS data from the aircraft to a remote location in response to the trigger signal.

2. The method of claim 1, further comprising collecting data from the HUMS system and generating the trigger signal when the HUMS data indicates the condition of the aircraft.

3. The method of claim 1, wherein the HUMS data indicated by the selected data template is related to the condition of the aircraft indicated by the trigger signal.

4. The method of claim 1, further comprising analyzing the HUMS data at the remote location to determine flight crew-enabling information.

5. The method of claim 4, further comprising transmitting the flight crew-enabling information from the remote location to the aircraft.

6. The method of claim 1, further comprising transmitting the HUMS data from the aircraft to the remote location over a satellite communication network.

7. The method of claim 1, wherein the transmitted HUMS data further comprises historical parametric HUMS data recorded prior to generating the trigger signal.

8. The method of claim 1, further comprising generating a request signal at the remote location to request additional HUMS data from the aircraft.

9. A system for operating an aircraft, comprising:
    a health and usage monitoring system (HUMS) system for sensing health and usage data during flight of the aircraft; and
    a data communication unit for retrieving HUMS data from the HUMS system, generating a trigger signal when the retrieved HUMS data meets a selected criterion, selecting, responsive to the trigger signal, a data template related to a condition of the aircraft indicated by the trigger signal, filling in the selected data template with HUMS data indicated by the selected data template, and transmitting the data template filled in with the HUMS data to a remote location in response to the trigger signal.

10. The system of claim 9, wherein the HUMS data includes parametric data related to the indicated condition and mechanical diagnostics data.

11. The system of claim 9, further comprising a processor at the remote location for analyzing the HUMS data to obtain flight crew-enabling information.

12. The system of claim 9, wherein the data communication unit transmits historical parametric HUMS data to the remote location.

13. The system of claim 9, wherein the data communication unit transmits the HUMS data to the remote location over a satellite communication link.

14. The system of claim 9, wherein the data communication unit transmits additional HUMS data in response to a request from the remote location.

15. The system of claim 14, wherein the additional HUMS data comprises:
    real-time HUMS data that is streamed to the remote location.

16. The system of claim 15, wherein the streamed real-time HUMS data is analyzed in real-time.

17. The method of claim 1, further comprising:
  streaming real-time HUMS data to the remote location in response to a request from the remote location.

18. The method of claim 17, wherein the streamed real-time HUMS data is analyzed in real-time.

\* \* \* \* \*